(12) United States Patent
Ding (10) Patent No.: US 10,736,358 B2
(45) Date of Patent: Aug. 11, 2020

(54) FLUE-CURED TOBACCO DEVICE AND A HEATING CONTROL METHOD THEREOF

(71) Applicant: SHENZHEN JIANAN TECHNOLOGY CO., LIMITED, Shenzhen, Guangdong (CN)

(72) Inventor: Jianjun Ding, Guangdong (CN)

(73) Assignee: SHENZHEN JIANAN TECHNOLOGY CO., LIMITED, Shenzhen, Guangdong (CN)

( * ) Notice: Subject to any disclaimer, the term of this patent is extended or adjusted under 35 U.S.C. 154(b) by 253 days.

(21) Appl. No.: 15/570,162

(22) PCT Filed: Apr. 28, 2017

(86) PCT No.: PCT/CN2017/082384
§ 371 (c)(1),
(2) Date: Oct. 27, 2017

(87) PCT Pub. No.: WO2018/195901
PCT Pub. Date: Nov. 1, 2018

(65) Prior Publication Data
US 2018/0310617 A1 Nov. 1, 2018

(51) Int. Cl.
*A24F 40/20* (2020.01)
*A24F 40/40* (2020.01)
(Continued)

(52) U.S. Cl.
CPC ............ *A24F 47/008* (2013.01); *A24F 40/20* (2020.01); *A24F 40/40* (2020.01); *H05B 1/0227* (2013.01); *H05B 1/0297* (2013.01); *G05B 15/02* (2013.01)

(58) Field of Classification Search
None
See application file for complete search history.

(56) References Cited

U.S. PATENT DOCUMENTS 4,966,171 A * 10/1990 Serrano ................ A24B 15/165
131/194
2004/0031495 A1* 2/2004 Steinberg .................. A24F 1/00
131/194
(Continued)

FOREIGN PATENT DOCUMENTS

CN 205018291 U 2/2016
CN 205072064 U 3/2016
(Continued)

OTHER PUBLICATIONS

State Intellectual Property Office of the P.R. China (ISR/CN), "International Search Report for PCT/CN2017/082384", China, dated Jan. 29, 2018.

*Primary Examiner* — Michael J Felton
(74) *Attorney, Agent, or Firm* — Locke Lord LLP; Tim Tingkang Xia, Esq.

(57) ABSTRACT

A flue-cured tobacco device and a heating control method thereof, the flue-cured tobacco device comprises a shell, an opening section is provided at an end of the shell, a fixing canister communicating with the opening section is provided in the shell, an end of the fixing canister is communicated with a first receiving section and a second receiving section successively, at least one net filter layer structure is defined in the first receiving section, a heating element is defined in the second receiving section; one end of a cigarette inserts into the first receiving section to abut the filter layer structure, the other end of the cigarette extends out the shell from the opening section. The flue-cured tobacco device of present invention makes users experience a taste of a real cigarette without the condition of producing tar, and the taste of the cigarette is soft to improve the users' experience.

12 Claims, 6 Drawing Sheets

(51) Int. Cl.
*A24F 47/00* (2020.01)
*H05B 1/02* (2006.01)
*G05B 15/02* (2006.01)

(56) References Cited

U.S. PATENT DOCUMENTS

2006/0118128 A1*  6/2006  Hoffmann ............ A24F 47/004
                                                  131/271
2014/0270729 A1   9/2014  DePiano et al.

FOREIGN PATENT DOCUMENTS

| CN | 205547352 U | 9/2016 |
| CN | 205547353 U | 9/2016 |
| CN | 205547354 U | 9/2016 |
| CN | 205757193 U | 12/2016 |
| CN | 205794803 U | 12/2016 |
| WO | 2014047955 A1 | 4/2014 |
| WO | 2016015196 A1 | 2/2016 |

* cited by examiner

FLUE-CURED TOBACCO DEVICE AND A HEATING CONTROL METHOD THEREOF

FIELD OF THE INVENTION

The present application relates to the field of electronic cigarettes, and more particularly relates to a flue-cured tobacco device and a heating control method thereof.

BACKGROUND OF THE INVENTION

Traditional smoking lights tobacco with fire, the tobacco burns to produce smoke for smokers to inhale. The smoke produced by burning of tobacco usually contains a lot kinds of harmful substances, therefore, the traditional tobacco not only caused a serious respiratory illness for smokers, but also easy to bring the dangers of secondhand smoke.

In order to solve the technical problems that traditional tobacco burns to produce harmful substances tar, etc, the technical personnel developed atomizing electronic cigarettes, the atomizing electronic cigarettes produce smoke by atomizing e-liquid at high temperature, although the atomizing electronic cigarettes overcome the above shortcomings of traditional cigarettes, but the e-liquid of electronic cigarettes is made of flavor and fragrance and is not real cigarette product, it is tasteless and lack of tobacco aroma, taste of the atomized e-liquid is not the same with the taste of the real cigarette, users can not experience the taste of real cigarette, thus atomizing electronic cigarettes can not be widely accepted by consumers. Therefore, how to allow users to experience the smell of real cigarettes and avoid the harm of tar to human body become an urgent problem in the tobacco industry.

SUMMARY OF THE INVENTION

The present application is to provide a flue-cured tobacco device and a heating control method thereof aiming at the defects that traditional tobacco burns to produce harmful substances, and the traditional tobacco not only caused a serious respiratory illness for smokers, but also easy to bring the dangers of secondhand smoke in the prior art.

The embodiments of the present application provide a flue-cured tobacco device, comprising a shell, an opening section is provided at an end of the shell, a fixing canister communicating with the opening section is provided in the shell, an end of the fixing canister opposite to the opening section is communicated with a first receiving section and a second receiving section successively, at least one net filter layer structure is provided in the first receiving section in the direction opposite to the opening section, a heating element is defined in the second receiving section;

one end of a cigarette is inserted into the fixing canister and the first receiving section successively along the opening section to abut the filter layer structure, the other end of the cigarette is extended out the shell from the opening section, the heating element is configured for heating air and transmitting the heat air to the cigarette via the filter layer structure to bake the cigarette evenly.

Preferably, the shell is provided with a connecting board at the opening section, an elastic bulge is provided between the connecting board and an end wall of the fixing canister towards the opening section, the elastic bulge is configured for fastening the fixing canister in the shell and clamping the cigarette in the fixing canister and the receiving section;

a cover board is provided between the connecting board and the shell, the cover board is configured for slidably covering on the end wall of the fixing canister towards the opening section when no cigarette is inserted.

Preferably, a thermal insulation canister configured for keeping warm for the second receiving section when the heating element heats up is provided outside the second receiving section, a bracket is sleeved outside the first receiving section, the second receiving section and the thermal insulation canister, one end of the bracket is communicated between the fixing canister and the receiving section, the other end of the bracket is abutted the an end wall of the thermal insulation canister opposite to the opening section, a first thermal insulation space configured for thermal insulation is provided between the bracket and the first receiving section, the second receiving section and the thermal insulation canister, thermal insulation materials are filled in the first thermal insulation space; a third receiving section and a fourth receiving section are provided between the shell and the bracket as well as the fixing canister, the third receiving section and the fourth receiving section are configured for receiving a circuit of the flue-cured tobacco device.

Preferably, a clamping unit is provided at an end of the bracket opposite to the opening section, one end of the clamping unit is abutted the end wall of the thermal insulation canister opposite to the opening section and is sleeved out an external circumferential wall of the thermal insulation canister, the other end of the clamping unit is abutted against an inlet pipe, a first connecting hole, a second connecting hole and a first inlet hole are provided on the clamping unit, the first connecting hole and the second connecting hole are configured for electric wires connected with two ends of the heating element going through, the first inlet hole is configured for air inflowing;

a second inlet hole is provided at an end of the shell opposite to the opening section, one end of the inlet pipe is communicated with the second inlet hole, the other end of the inlet pipe is communicated with the thermal insulation canister through the first inlet hole of the clamping unit.

Preferably, the filter layer structure comprises a first filter layer close to the opening section and a second filter layer opposite to the opening section, several first filter holes are provided on the first filter layer, several second filter holes are provided on the second filter layer;

an inner wall of the end of the first receiving section opposite to the opening section shrinks radially to form a first limit step and a second limit step, the first limit step and the second limit step are configured for clamping and fastening the first filter layer and the second filter layer respectively to provide a flowing gap for hot air flowing between the first filter layer and the second filter layer, a distance of the flowing gap between the first filter layer and the second filter layer is 0.5 to 8 mm.

Preferably, the flue-cured tobacco device further comprising:

a temperature sensor provided on an outer wall of the first receiving section and configured for measuring a temperature of the cigarette in the first receiving section and transmitting a temperature signal;

a PCB circuit board provided in the third receiving section;

an airflow sensor provided in a measuring unit, the measuring unit is sleeved outside the inlet pipe and communicated with the inlet pipe, the airflow sensor is configured for sensing and transmitting an airflow signal;

a controller provided on the circuit board and connected with the heating element, the temperature sensor, the airflow sensor respectively, the controller is configured for receiving the airflow signal and the temperature signal and controlling the heating element to heat tobacco material according a preset temperature;

a battery provided in the fourth receiving section and configured for supplying power to the airflow sensor, the temperature sensor, the controller and the heating element;

a switch provided on an outer wall of the shell and connected to the controller and the battery respectively, the switch is configured for controlling the connection between the controller and the battery.

Preferably, a accommodation body is provided axially in the bracket, one end of the accommodation body is abutted against an end of the bracket towards the opening section and is communicated with the fixing canister through the bracket, the other end of the accommodation body is detachably connected with the thermal insulation canister, an end of the accommodation body opposite to the opening section shrinks radially to form a heating canister, the first receiving section is formed in the accommodation body, the second receiving section is formed in the heating canister, the heating element extends helically along an axial of the heating canister and is abutted against an inner wall of the heating canister;

a fourth connecting hole is opened on an end wall of the accommodation body opposite to the opening section, the accommodation body is communicated with the heating canister, a second through-hole is opened on an end wall of the heating canister opposite to the opening section;

a third thermal insulation space configured for thermal insulation is provided between the thermal insulation canister and the heating canister.

Preferably, one end of the heating element runs through the fourth connecting hole and extends opposite to the opening section then runs through the first connecting hole and is connected to the controller by winding one side of the battery, the other end of the heating element runs through the second through-hole and the second connecting hole then is connected to the controller by wing the other side of the battery, two ends of the heating element are space welded to two corresponding sides of the PCB circuit board respectively.

Preferably, a accommodation body is provided axially in the bracket, one end of the accommodation body is abutted against an end of the bracket towards the opening section and is communicated with the fixing canister through the bracket, the other end of the accommodation body is detachably connected with the thermal insulation canister, the first receiving section and the second receiving section are both formed in the accommodation body, the heating element is provided circinately between an end wall of the accommodation body opposite to the opening section and the second filter layer;

a third connecting hole and a first through-hole are opened on the end wall of the accommodation body opposite to the opening section;

a second thermal insulation space configured for thermal insulation is formed between the thermal insulation canister and the end wall of the accommodation body opposite to the opening section.

Preferably, one end of the heating element runs through the third connecting hole and extends opposite to the opening section then runs through the first connecting hole and is connected to the controller by winding one side of the battery, the other end of the heating element runs through the first through-hole and the second connecting hole then is connected to the controller by wing the other side of the battery, two ends of the heating element are space welded to two corresponding sides of the PCB circuit board respectively.

Preferably, a diameter of each first filter hole is 0.2 to 3.0 mm, the several first filter holes are evenly distributed on the first filter layer, a distance of circles centers of each two adjacent first filter holes is 0.6 to 3.0 mm;

a diameter of each second filter hole is 0.8 to 6.0 mm, a distance from center of each second filter hole to a center of the second filter layer is 2 to 12 mm.

Preferably, the fixing canister, the thermal insulation canister, the bracket and the shell are made of thermal insulation materials, the opening section is made of elastic thermal insulation materials, and the accommodation body is made of thermal conduction materials.

The present application further provides a heating control method for the flue-cured tobacco device, the heating control method comprises following steps:

S1, inserting a cigarette along an opening section into a fixing canister and a first receiving section to abut against a first filter layer;

S2, controlling a heating element to heat air flowing into a second receiving section according to a preset temperature, then the heated air flows into the first receiving section to bake the cigarette.

Preferably, the step S2 comprises following steps:

S21, when the airflow sensor detects an airflow signal and transmits the airflow signal to the controller, or when a user manually controls the controller to operate, the controller controls the heating element to heat up to a first preset temperature;

S22, if the airflow sensor continually detects the airflow signal, then goes on the step S23; if the airflow sensor no longer detecting the airflow signal, then goes on the step S24;

S23, the controller controls the heating element to heat to a second preset temperature, a temperature sensor detects a temperature of the first receiving section and transmits the temperature signal to the controller, when the detected temperature is lower than the second preset temperature, the controller controls the heating element to heat up continually, when the detected temperature is higher than the second preset temperature, the controller controls the heating element to stop heating;

S24, the temperature sensor detects the temperature of the first receiving section and transmits the temperature signal to the controller, when the detected temperature is lower than the first preset temperature, the controller controls the heating element to heat up continually, when the detected temperature is higher than the first preset temperature, the controller controls the heating element to stop heating.

When implementing the one or more technical solutions of present application, the following advantageous effects can be achieved: distracting the heat produced by the heating element by providing the net filter layer structure, to make the cigarette positioned on the net filter layer structure be heated evenly and to make the user experience a taste of real cigarette without producing tar at the same time, besides the airflow is buffered by the filter layer structure, the taste is soft to improve the users' experience.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

Embodiments of present application by provides a flue-cured tobacco device, distracts the heat produced by the heating element by providing the net filter layer structure, to make the cigarette positioned on the net filter layer structure be heated evenly and to make the user experience a taste of real cigarette without producing tar at the same time, besides the airflow is buffered by the filter layer structure, the taste is soft to improve the users' experience.

To make the technical feature, objective and effect of the present application be understood more clearly, now the specific implementation of the present application is described in detail with reference to the accompanying drawings and embodiments, understandably that the embodiments and specific features of embodiments are a detailed description of the technical solution of present application, but not a limit of the technical solution of present application, the embodiments and specific features of embodiments can be combined without conflict.

The First Embodiment

Figure 1:
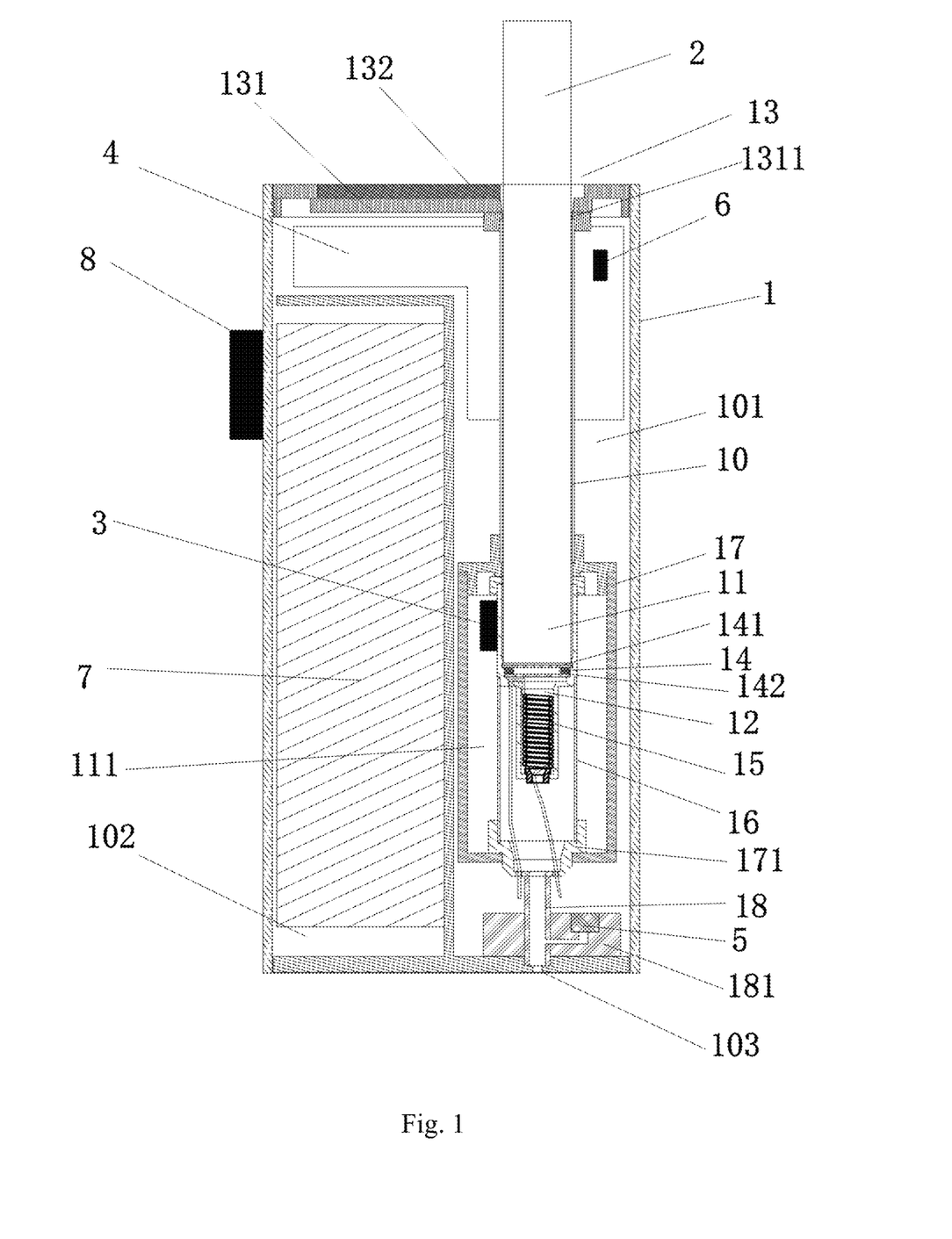
FIG. 1 is a section view of a flue-cured tobacco device of a first embodiment of the present application.

FIG. 1 is a section view of a flue-cured tobacco device of a first embodiment of the present application.

As shown in FIG. 1, the present application provides a flue-cured tobacco device, comprising a shell 1, an opening section 13 is provided at an end of the shell 1, a fixing canister 10, a first receiving section 11, a second receiving section 12, a heating element 15 and a thermal insulation canister 16 are provided in the shell 1, a cigarette 2 is inserted into the fixing canister 10 and the first receiving section 11. The shell 1 is roughly elliptical-cylindrical structure, the fixing canister 10 configured for accommodating the cigarette 2 is cylindrical structure matching with the shape of the cigarette 2, and the fixing canister 10 is made of thermal insulation materials to avoid heat is conducted along the fixing canister 10 to the shell 1 at the opening section 13, one end of the first receiving section 11 is communicated with the opening section 13 through the fixing canister 10, the shape of the first receiving section 11 is matched with the cigarette 2 to save space of the flue-cured tobacco device and to clamp the cigarette 2 in the first receiving section 11, which makes the baking of the cigarette 2 is more evenly and gently, the other end of the first receiving section 11 is communicated with a second receiving section 12, at least one net filter layer structure 14 is provided in the first receiving section 11 in the direction opposite to the opening section 13, the heating element 15 is defined in the second receiving section 12; one end of the cigarette 2 inserts into the fixing canister 10 and the first receiving section 11 successively along the opening section 13 to abut the filter layer structure 14, the other end of the cigarette 2 extends out the shell 1 from the opening section 13, the heating element 15 is configured for transmitting heat and baking the cigarette 2 evenly from the filter layer structure 14 when heating, a thermal insulation canister 16 is provided outside the second receiving section 12 and is configured for keeping warm for the second receiving section 12 when the heating element 15 heats, which slows down the heat in the second receiving section 12 to distribute around and reduce the preheating time of the heating wire to save power of the battery. In the specific implementation process, with the flow direction of the airflow to contact the net filter layer structure 14 sufficiently, the heat is transmitted to the net filter layer structure 14, the net filter layer structure 14 is heated evenly, then the cigarette 2 abutting against the filter layer structure 14 is same heated evenly to bake smoke with soft taste.

In order to better fasten the cigarette 2 in the first receiving section 11, the shell 1 is provided with a connecting board 131 at the opening section 13, an elastic bulge 1311 is provided between the connecting board 131 and an end wall of the fixing canister 10 towards the opening section 13, the bulge 1311 is configured for fastening the fixing canister 10 in the shell 1 and clamping the cigarette 2 in the fixing canister 10 and the receiving section 11, in this embodiment, the opening section 13 is elastic thermal insulation structure such as silicone, thermal insulation plastic, etc., and the opening section 13 further has sealing effect.

Furthery, a cover board 132 is provided between the connecting board 131 and the shell 1, the cover board 132 is configured for slidably covering on the end wall of the fixing canister 10 towards the opening section 13 when the cover board 132 is not inserted into the cigarette 2, when the user does not use the flue-cured tobacco device, the cover board 132 can avoid impurities such as dust going into the first receiving section 11 from the opening section 13, the cover board 132 plays a role of sealing and keeping clean of the flue-cured tobacco device.

Specifically, a bracket 17 is sleeved outside the first receiving section 11, the second receiving section 12 and the thermal insulation canister 16, one end of the bracket 17 is communicated between the fixing canister 10 and the receiving section 11, the other end of the bracket 17 abuts the an end wall of the thermal insulation canister 16 opposite to the opening section 13, a clamping unit 171 is provided at an end of the bracket 17 opposite to the opening section 13, the section of the clamping unit 171 is in a hollow trumpet shape, one end of the clamping unit 171 which is in a cylindrical shape is abutted the end wall of the thermal insulation canister 16 opposite to the opening section 13 and is sleeved out an external circumferential wall of the thermal insulation canister 16, the other end of the clamping unit 171 is extended along the cylinder towards the direction opposite to the opening section 13, and a periphery is abutted against a bottom wall of the bracket 17, the other end of the clamping unit 171 is communicated with an inlet pipe 18, a second inlet hole 103 is provided at an end of the shell 1 opposite to the opening section 13, the air flows into the inlet pipe 18 through the inlet hole 103, and runs into the thermal insulation canister 16 along the clamping unit 171, then goes into the first receiving section 11 to bake the cigarette 2 after being heated by the heating element 15 in the second receiving section 12. In this embodiment, as the high temperature tolerance is needed, the bracket 17 is elastic thermal insulation structure such as silicone, thermal insulation plastic, etc. and the bracket 17 has good sealing effect. In order to furtherly improve the thermal insulation effect, a first thermal insulation space 111 configured for thermal insulation is provided between the bracket 17 and the first receiving section 11, the second receiving section 12 and the thermal insulation canister 16, the thermal insulation canister 10 is also made of thermal insulation materials, thermal insulation materials are filled in the first thermal insulation space 111 to slow down the heat in the second receiving section 12 to distribute around and reduce the preheating time of the heating wire to save power of the battery. A third receiving section 101 and a fourth receiving section 102 are provided between the shell 1 and the bracket 17 as well as the fixing canister 10, control circuits can be defined in the third receiving section 101 and the fourth receiving section 102, the third receiving section 101 and the fourth receiving section 102 are both thermally insulated from the bracket 17 to make the control circuit being not affected by the temperature of the heating element 15.

In order to control the heating element 15 to heat the tobacco matter, the flue-cured tobacco device further comprises: a temperature sensor 3, which can be fastened on an outer wall of the first receiving section 11 by pasting, welding, etc, the temperature sensor 3 is configured for measuring a temperature of the first receiving section 11, that is to say the temperature sensor 3 is configured for measuring a temperature of the cigarette 2 and transmitting a temperature signal; a PCB circuit board 4 provided in the third receiving section 101, as the third receiving section 101 is thermally insulated from the bracket 17, therefore the PCB circuit board can avoid being effected by the high temperature of the heating element 15; an airflow sensor 5 provided in a measuring unit 181, the measuring unit 181 is sleeved outside the inlet pipe 18 and communicated with the inlet pipe 18, as the airflow sensor 5 is not directly defined in the inlet pipe 18 but is communicated with the inlet pipe 18 through a divided flow, thus the airflow reaching the airflow sensor is more gently and is beneficial for the accurate measurement of the airflow sensor; a controller 6 provided on the circuit board 4 and connected with the heating element 15, the temperature sensor 3, the airflow sensor 5 respectively, the controller 6 is configured for receiving the airflow signal and the temperature signal and controlling the heating element 15 to heat the evaporated material according a preset temperature, the controller 6 can adjust the power of the heating element 15 to adjust the heating temperature according to the airflow signal transmitted by the airflow sensor 5 and the temperature signal transmitted by the temperature sensor 3; a battery 7 provided in the fourth receiving section 102 and configured for supplying power to the airflow sensor 5, the temperature sensor 3, the controller 6 and the heating element 15, as the third receiving section 102 is thermally insulated from the bracket 17, therefore the battery 7 can avoid being affected by the high temperature of the heating element 15; a switch 8 provided on an outer wall of the shell 1 and connected to the controller 6 and the battery 7 respectively, the switch 8 is configured for controlling the connection between the controller 6 and the battery 7, when the switch is triggered, the circuit is conducted, the heating element 15 starts to heat, a preset temperature is set in advance in the controller 6, in the practical heating process, the controller 6 compares the practical received heating temperature with the preset temperature, or the practical temperature is higher than the preset temperature, the controller 6 controls the MOS transistor to turn off, the switch 8 is connected to the controller 6 through the shell 1 and the bracket 17, the controller 6 can automatically control the operation of the heating element 15, and the user can manually control the operation of the heating element 15 through the switch 8.

Figure 2:
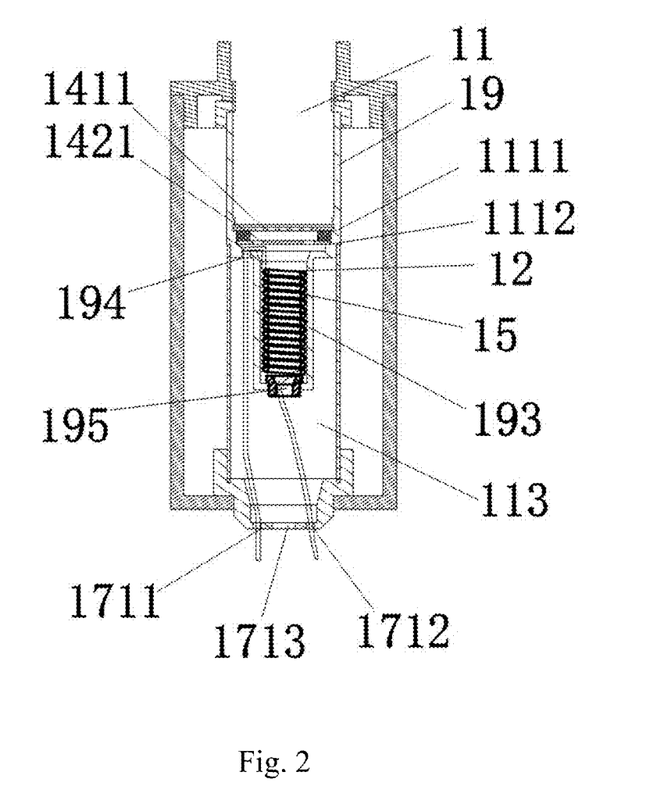
FIG. 2 is a section view of a bracket of a first embodiment of the present application.

FIG. 2 is a section view of a bracket of a first embodiment of the present application.

As shown in FIG. 2, a accommodation body 19 is provided axially in the bracket 17, one end of the accommodation body 19 abuts against an end of the bracket 17 towards the opening section 13 and is communicated with the fixing canister 10 through the bracket 17, the other end of the accommodation body 19 is detachably connected with the thermal insulation canister 16, as the high temperature tolerance is needed, in this embodiment, the accommodation body 19 is made of aluminum alloy and is integrated, the accommodation body 19 can conduct the heat produced by the heating element 15 to the cigarette 2 and can heat the cigarette 2 along the outer circumferential wall, in other embodiments, the accommodation body 19 is made of ceramic materials. An end of the accommodation body 19 opposite to the opening section 13 shrinks radially to form a heating canister 193, the first receiving section 11 is formed in the accommodation body 19, the second receiving section 12 is formed in the heating canister 193, the heating element 15 extends helically along an axial of the heating canister 193 and abuts against an inner wall of the heating canister 193, the volume of the second receiving section 12 is larger at present, the direct contact area is smaller, and the effect of heating and baking is gently; a fourth connecting hole 194 is opened on an end wall of the accommodation body 19 opposite to the opening section 13, the accommodation body 19 is communicated with the heating canister 193, a second through-hole 195 is opened on an end wall of the heating canister 193 opposite to the opening section 13; the fourth connecting hole 194 and the second through-hole 195 are configured for wires at two ends of the heating element 15 to go through, and a airflow gap as an inlet hole is defined between the wires and the fourth connecting hole 194 and the second through-hole 195; in order to improve the thermal insulation effect, a third thermal insulation space 113 configured for thermal insulation is formed between the thermal insulation canister 16 and the heating canister 193.

Specifically, one end of the heating element 15 runs through the fourth connecting hole 194 and extends opposite to the opening section 13 then runs through the first connecting hole 1711 and is connected to the controller 6 by winding one side of the battery 7, the other end of the heating element 15 runs through the second through-hole 195 and the second connecting hole 1712 then is connected to the controller 6 by wing the other side of the battery 7, two ends of the heating element 15 are space welded to two corresponding sides of the PCB circuit board 4 respectively, which can prevent the two connecting wires contacting and causing a short circuit because of the transportational process or vibration.

Figure 5:
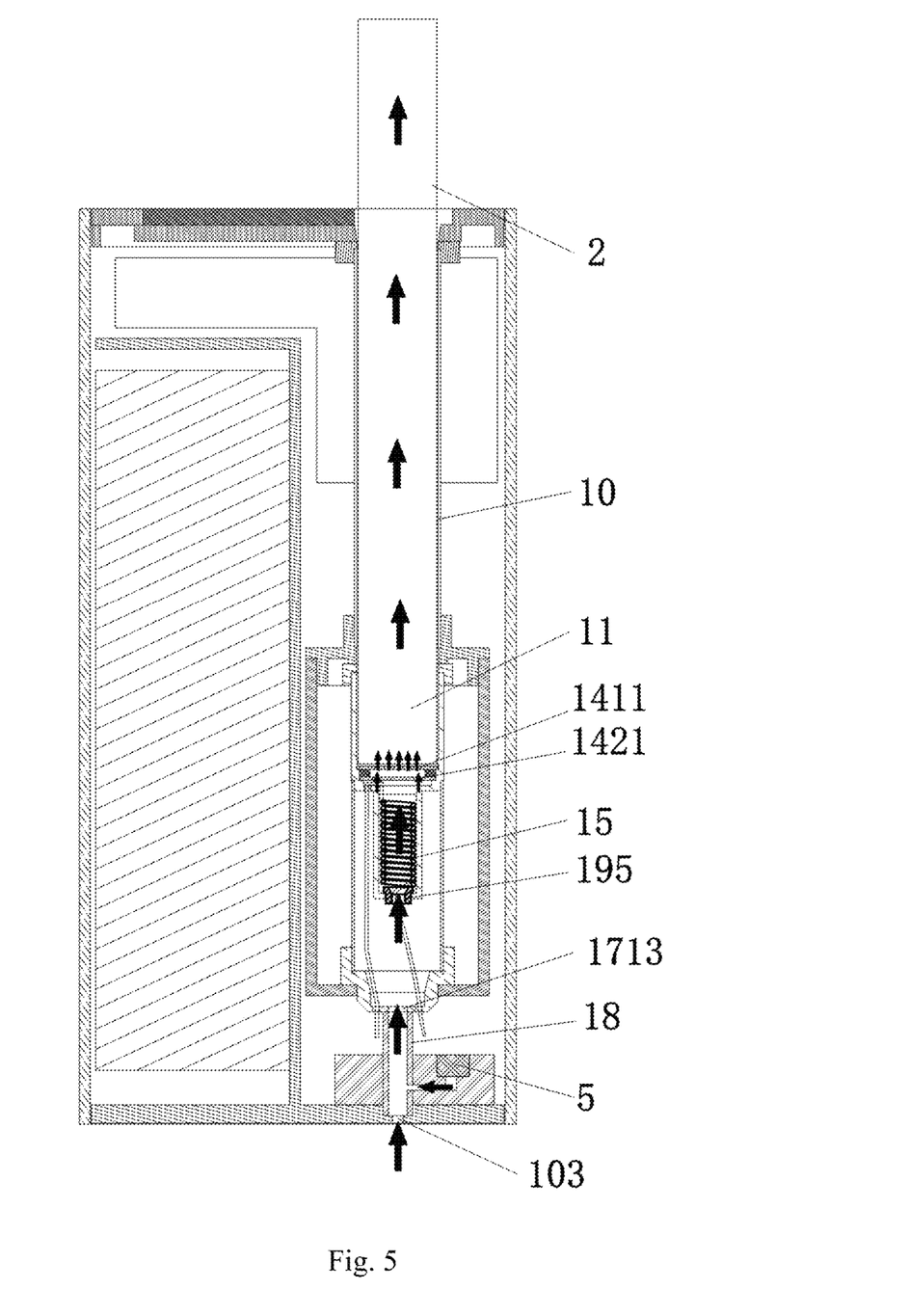
FIG. 5 is a schematic view of airflow of the flue-cured tobacco device of a first embodiment of the present application.

FIG. 5 is a schematic view of airflow of the flue-cured tobacco device of a first embodiment of the present application.

As shown in FIG. 5, the airflow goes into the shell 1 through the second inlet hole 103, when the airflow runs into the inlet pipe 18, a negative pressure is produced because of the flowing of the airflow in the inlet pipe 18, the pressure at the airflow sensor 5 is higher than the pressure at the inlet pipe 18, the air at the airflow sensor 5 flows towards the inlet pipe 18, then the airflow sensor 5 detects the airflow; the airflow in the inlet pipe 18 flows into the thermal insulation canister 16 through the first inlet hole 1713, then passes by the heating element 15 through the second through-hole 195, the heated hot air runs through the second filter hole 1421 and the first filter hole 1411 respectively then flows into the first receiving section 10 to bake the cigarette 2, then flows along the cigarette 2 in the first receiving section 11 and the fixing canister 10 into the user's mouth. With the flow direction of the airflow to contact the net filter layer structure 14 sufficiently, the heat is transmitted to the net filter layer structure 14, the net filter layer structure 14 is heated evenly, then the cigarette 2 abutting against the filter layer structure 14 is same heated evenly to bake smoke with soft taste. To make sure the smooth and adjustability of the total airflow channel, in a preferable embodiment, each corresponding inlet hole can be provided with a flexible cover, the flexible cover can be opened and closed according to the flowing of the airflow and can adjust the airflow by the opening extent.

Figure 6:
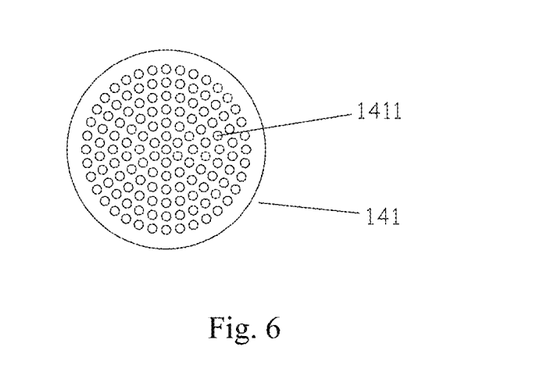
FIG. 6 is a structural schematic view of a first filter layer of FIG. 1.

FIG. 6 is a structural schematic view of a first filter layer of FIG. 1.

As shown in FIG. 6, a diameter of each first filter hole 1411 is 0.2 to 3.0 mm, the several first filter holes 1411 are evenly distributed on the first filter layer 141, a distance of circles centers of each two adjacent first filter holes 1411 is 0.6 to 3.0 mm.

Figure 7:
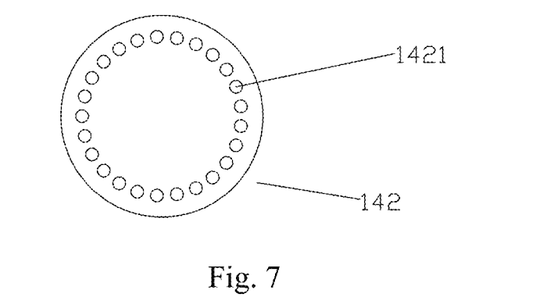
FIG. 7 is a structural schematic view of a second filter layer of FIG. 1.

FIG. 7 is a structural schematic view of a second filter layer of FIG. 1.

As shown in FIG. 7, a diameter of each second filter hole 1421 is 0.8 to 6.0 mm, a distance from center of each second filter hole 1421 to a center of the second filter layer 142 is 2 to 12 mm. The number of the first filter holes 1411 is more than the number of the second filter holes 1421. the center of the second filter layer 142 is not provided with any second filter hole 1421, only a circle of second filter holes 1421 are provided next to a rim of the second filter layer 142, the direction of the airflow is changed to play a role of buffering, and the gas flow is ensured at the same time; the number of the first filter holes 1411 on the first filter layer 141 is more than the number of the second filter holes 1421 and the diameter of the first filter hole 1411 is smaller than that of the second filter hole 1421, the gas flow is ensured and the baking effect is gently at the same time, the taste of the smoke baked is better and the user's experience is improved.

Figure 8:
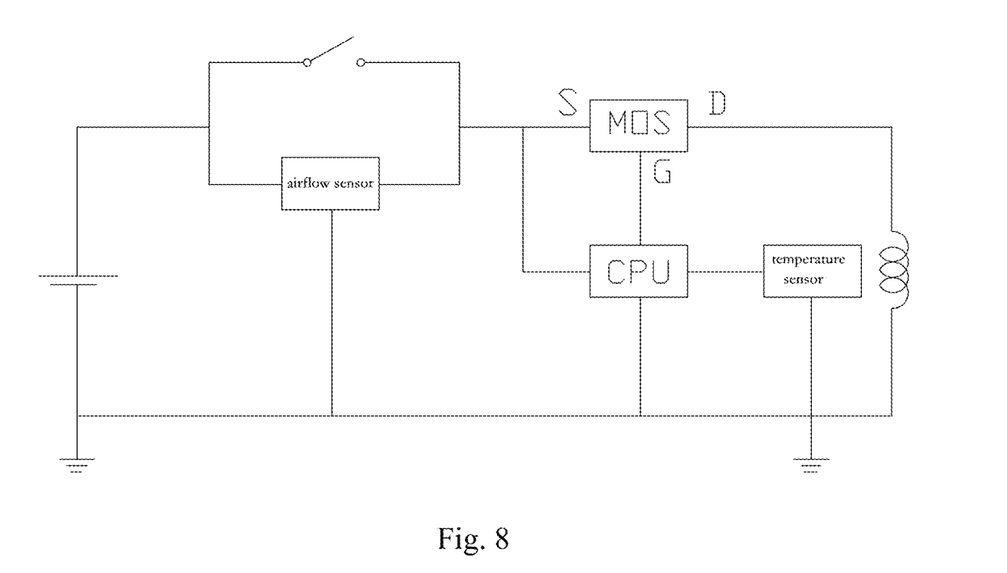
FIG. 8 is a circuit schematic view of the flue-cured tobacco device of a first embodiment of the present application.

FIG. 8 is a circuit schematic view of the flue-cured tobacco device of a first embodiment of the present application.

As shown in FIG. 8, in this embodiment, the controller 6 comprises a CPU (microcontroller) and a MOS transistor, the heating element 15 is a heating wire, the airflow sensor and the switch are connected in parallel and then one end is connected to a positive pole of the power supply, the other end is connected to a source of the MOS transistor and the CPU respectively, a drain of the MOS transistor is connected to one end of the heating wire, a grid of the MOS transistor is connected to the CPU, the CPU is further connected to one end of the temperature sensor close to the heating wire, the other end of the temperature sensor is grounded, the other end of the heating wire is connected to a negative pole of the power supply, the negative pole of the power supply is connected to the airflow and the CPU respectively. In this circuit figure, the airflow sensor and the switch are connected in parallel, when the switch is turned off, the airflow sensor detects airflow in the airflow channel caused by a smoking action of the user, the airflow signal is transmitted to the CPU, the CPU automatically controls the heating wire to heat, this kind of design makes that the flue-cured tobacco device can control automatically or manually at the same time. The temperature sensor transmits the detected temperature signal to the CPU, when the temperature is higher than the preset temperature such as 200° C., the CPU controls the MOS transistor to turn off the power supply to stop the working of the heating wire, at present the temperature of the heating wire gradually decreases, when the temperature is lower than the preset temperature, the CPU controls the MOS transistor to turn on the power supply, the heating wire returns to work, by controlling the heating wire, the preheating time is short and energy consumption is small, besides the smoke is baked evenly and taste is soft. The switch and the airflow are connected in parallel, when the flowing of airflow is detected or the switch is turned on or both occurs, the circuit is conducted, the controller controls the work of the heating wire by controlling the open or close of the MOS transistor. A preferable embodiment: considering the security and to prevent the mistake inhaling, it can be designed as the circuit is conducted when the controller receives both the signal of the switch and the airflow signal to realize a more reliable control.

The Second Embodiment

Figure 4:
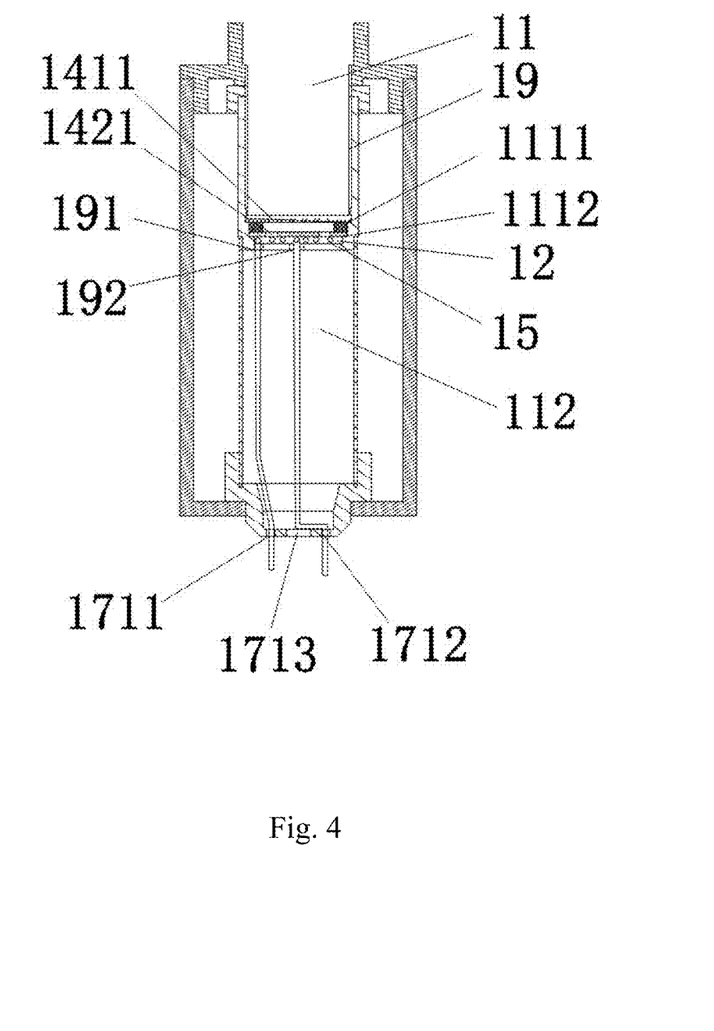
FIG. 4 is a section view of a bracket of a second embodiment of the present application.

FIG. 4 is a section view of a bracket of a second embodiment of the present application.

Figure 3:
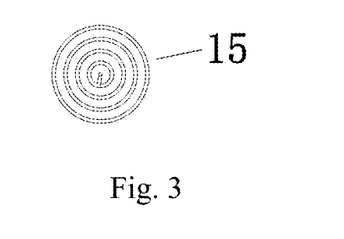
FIG. 3 is a vertical view of a heating element of a first embodiment of the present application.

As shown in FIG. 4, the difference between the second embodiment and the first embodiment of present application is the position of the second receiving section 12 and the shape design of the heating element 13, in this embodiment, a accommodation body 19 is provided axially in the bracket 17, one end of the accommodation body 19 abuts against an end of the bracket 17 towards the opening section 13 and is communicated with the fixing canister 10 through the bracket 17, the other end of the accommodation body 19 is detachably connected with the thermal insulation canister 16, as the high temperature tolerance is needed, the accommodation body 19 is made of aluminum alloy and is integrated, the accommodation body 19 can conduct the heat produced by the heating element 15 to the cigarette 2 and can heat the cigarette 2 along the outer circumferential wall, in other embodiments, the accommodation body 19 is made of ceramic materials. In the second embodiment of present application, the first receiving section 11 and the second receiving section 12 are both formed in the accommodation body 19, FIG. 3 is a vertical view of a heating element of a first embodiment of the present application, as shown in FIG. 3, the heating element 15 is provided circinately between an end wall of the accommodation body 19 opposite to the opening section 13 and the second filter layer 142, the circinate design of the heating element 15 increases the contact area between the heating element 15 and the filter layer structure 14, besides the volume of the second receiving section 12 is smaller, thus the heat in the second receiving section 12 is concentrated, and the whole structure of the accommodation body 19 is simple and easy to process, a third connecting hole 191 and a first through-hole 192 are opened on the end wall of the accommodation body 19 opposite to the opening section 13, the first through-hole 192 is configured for communicating with the thermal insulation canister 16, the third connecting hole 191 and the first through-hole 192 are configured for wires at two ends of the heating element 15 to go through, and a airflow gap as an inlet hole is defined between the wires and the third connecting hole 191 and the second through-hole 192, in order to improve the thermal insulation effect, a second thermal insulation space 112 configured for thermal insulation is formed between the thermal insulation canister 16 and the end wall of the accommodation body 19 opposite to the opening section 13.

Specifically, the clamping unit 171 is hollow to form a first inlet hole 1713 communicated with the inlet pipe 18, a second connecting hole 1712 and a first inlet hole 1713 are provided on the clamping unit 171, the first connecting hole 1711 and the second connecting hole 1712 are configured for electric wires connected with two ends of the heating element 15 going through. One end of the heating element 15 runs through the third connecting hole 191 and extends opposite to the opening section 13 then runs through the first connecting hole 1711 and is connected to the controller 6 by winding one side of the battery 7, the other end of the heating element 15 runs through the first through-hole 192 and the second connecting hole 1712 then is connected to the controller 6 by wing the other side of the battery 7, two ends of the heating element 15 are space welded to two corresponding sides of the PCB circuit board 4 respectively, which can prevent the two connecting wires contacting and causing a short circuit because of the transportational process or vibration.

The Third Embodiment

Figure 9:
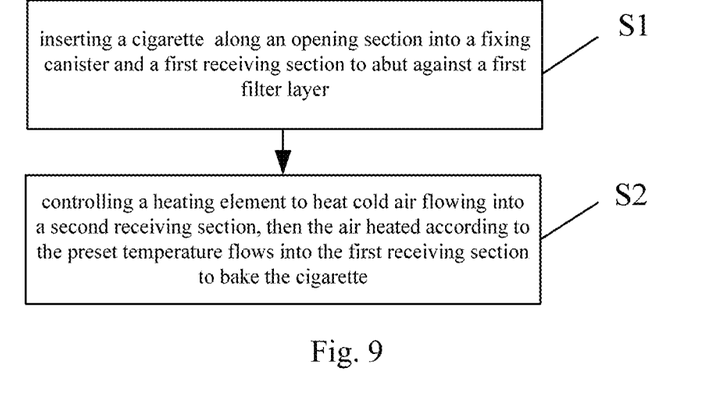
FIG. 9 is a flow chart of a heating control method of a third embodiment of the present application.

FIG. 9 is a flow chart of a heating control method of a third embodiment of the present application.

As shown in FIG. 9, the present application further provides a heating control method, comprising following steps:

S1, inserting a cigarette 2 along an opening section 13 into a fixing canister 10 and a first receiving section 11 to abut against a first filter layer 141;

Specifically, the fixing canister 10 configured for accommodating the cigarette 2 is cylindrical structure matching with the shape of the cigarette 2, and the fixing canister 10 is made of thermal insulation materials to avoid heat is conducted along the fixing canister 10 to the shell 1 at the opening section 13, one end of the first receiving section 11 is communicated with the opening section 13 through the fixing canister 10, the shape of the first receiving section 11 is matched with the cigarette 2 to save space of the flue-cured tobacco device and to clamp the cigarette 2 in the first receiving section 11, which makes the baking of the cigarette 2 is more evenly and gently.

S2, controlling a heating element 15 to heat cold air flowing into a second receiving section 12 according to the preset temperature, then the heated air flows into the first receiving section 11 to bake the cigarette 2.

The Fourth Embodiment

Figure 10:
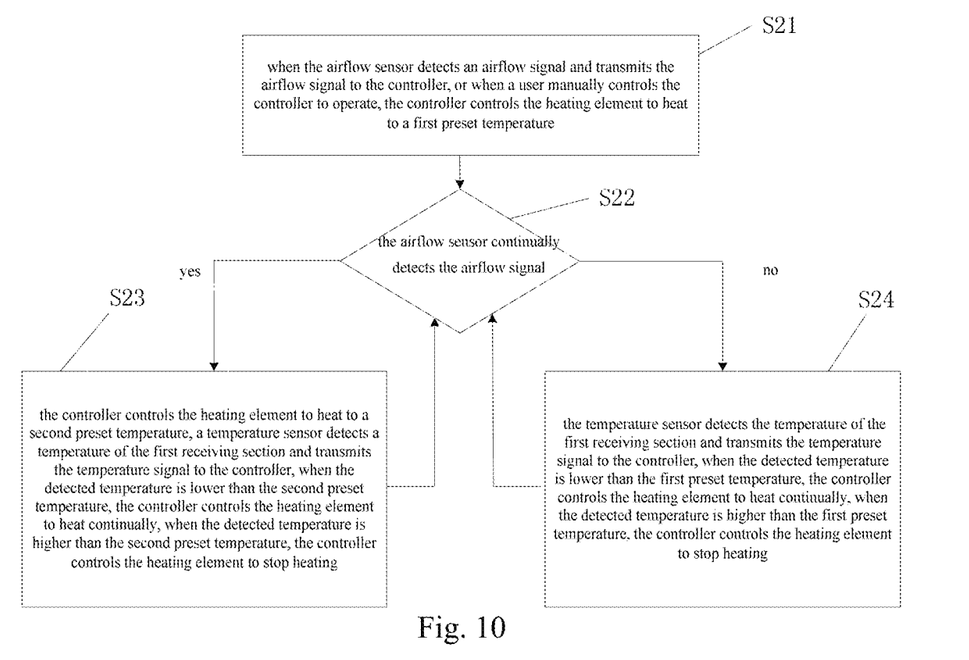
FIG. 10 is a flow chart of a heating control method of a fourth embodiment of the present application.

FIG. 10 is a flow chart of a heating control method of a fourth embodiment of the present application.

The step S2 comprises following steps:

S21, when the airflow sensor 5 detects an airflow signal and transmits the airflow signal to the controller, or when a user manually controls the controller 6 to operate, the controller 6 controls the heating element 15 to heat up to a first preset temperature;

Specifically, the user controls the controller 6 to operate by the switch 7, a temperature key can be provided at the switch which is convenient for the user to set manually the first preset temperature of the heating element 15.

S22, if the airflow sensor 5 continually detects the airflow signal, then goes on the step S23; if the airflow sensor 5 no longer detecting the airflow signal, then goes on the step S24;

S23, the controller 6 controls the heating element 15 to heat to a second preset temperature, a temperature sensor detects a temperature of the first receiving section 11 and transmits the temperature signal to the controller 6, when the detected temperature is lower than the second preset temperature, the controller 6 controls the heating element 15 to heat up continually, when the detected temperature is higher than the second preset temperature, the controller 6 controls the heating element 15 to stop heating;

when the temperature sensor 5 continually detects the airflow signal, which shows the user is smoking continually, then the controller 6 controls the heating element 15 to go on heating up to keep the temperature in the first receiving section 11 as a high second preset temperature, to furtherly improve the taste during smoking, usually the second preset temperature is 20° C. to 30° C. warmer than the first preset temperature, in this embodiment, the second preset temperature is 230° C.

S24, the temperature sensor 3 detects the temperature of the first receiving section 11 and transmits the temperature signal to the controller 6, when the detected temperature is lower than the first preset temperature, the controller 6 controls the heating element 15 to heat up continually, when the detected temperature is higher than the first preset temperature, the controller 6 controls the heating element 15 to stop heating.

When the temperature sensor 5 no longer detects the airflow signal, which shows the user stops smoking, then the controller 6 controls the heating element 15 to keep the temperature in the first receiving section 11 as a first preset temperature to save power.

The step S22 is repeated to control the operation of the heating element 15 to adjust the temperature in the first receiving section 11 in time according to the smoking action of the user, which improves the taste when the user is smoking as well as decreases the temperature of the heating element 15 to save power when the user stops smoking.

Specifically: the controller 6 has a memory function and is configured for storing a preset temperature, the controller 6 further has a judge process, when the detected temperature is lower than the preset temperature, the controller 6 controls the heating element 15 to go on heating, when the detected temperature is higher than the preset temperature, the controller 6 controls the heating element 15 to stopping heating. The controller 6 can also has a timekeeping function and starts timekeeping when the heating element 15 reaches the preset temperature at a first time, when a smoking time of the user is longer than a preset time, the controller 6 controls the heating element 15 to stop heating, a time adjust key can be provided at the position of the switch 7, then the user can manually set the smoking time through the key, which protects the lifetime of the device as well as preventing the user from smoking too long.

To sum up, by the heating element by providing the net filter layer structure, to make the cigarette positioned on the net filter layer structure be heated evenly and to make the user experience a taste of real cigarette without producing tar at the same time, besides the airflow is buffered by the filter layer structure, the taste is soft to improve the users' experience.

Although the preferable embodiments of present application have been described, one skilled in the art can change or amend these embodiments once they know the basis creativity, therefore, the attached claims are interpreted as comprising preferable embodiments and, the all change or amendment belongs to present application.

Obviously, those ordinary skills in the art can also make many modifications without breaking away from the subject of the present application and the protection scope of the claims. All these modifications belong to the protection of the present application.

The invention claimed is:

1. A flue-cured tobacco device, comprising a shell (1), wherein an opening section (13) is provided at an end of the shell (1), a fixing canister (10) communicating with the opening section (13) is provided in the shell (1), an end of the fixing canister (10) opposite to the opening section (13) is communicated with a first receiving section (11) and a second receiving section (12) successively; at least one net filter layer structure (14) is provided in the first receiving section (11) in the direction opposite to the opening section (13), a heating element (15) is defined in the second receiving section (12); and wherein one end of a cigarette (2) is inserted into the fixing canister (10) and the first receiving section (11) successively along the opening section (13) to abut the filter layer structure (14), the other end of the cigarette (2) is extended out the shell (1) from the opening section (13); the heating element (15) is configured for heating air and transmitting the heated air to the cigarette (2) via the filter layer structure (14) to bake the cigarette (2) evenly.

2. The flue-cured tobacco device according to claim 1, wherein the shell (1) is provided with a connecting board (131) at the opening section (13), an elastic bulge (1311) is provided between the connecting board (131) and an end wall of the fixing canister (10) towards the opening section (13), the elastic bulge (1311) is configured for fastening the fixing canister (10) in the shell (1) and clamping the cigarette (2) in the fixing canister (10) and the receiving section (11); and wherein a cover board (132) is provided between the connecting board (131) and the shell (1), the cover board (132) is configured for slidably covering on the end wall of the fixing canister (10) towards the opening section (13) when no cigarette (2) is inserted.

3. The flue-cured tobacco device according to claim 1, wherein a thermal insulation canister (16) configured for keeping warm for the second receiving section (12) when the heating element (15) heats up is provided outside the second receiving section (12); a bracket (17) is sleeved outside the first receiving section (11), the second receiving section (12) and the thermal insulation canister (16); one end of the bracket (17) is communicated between the fixing canister (10) and the receiving section (11), the other end of the bracket (17) is abutted the an end wall of the thermal insulation canister (16) opposite to the opening section (13); a first thermal insulation space (111) configured for thermal insulation is provided between the bracket (17) and the first receiving section (11), the second receiving section (12) as well as the thermal insulation canister (16); thermal insulation materials are filled in the first thermal insulation space (111); and wherein a third receiving section (101) and a fourth receiving section (102) are provided between the shell (1) and the bracket (17) as well as the fixing canister (10), the third receiving section (101) and the fourth receiving section (102) are configured for receiving a circuit of the flue-cured tobacco device.

4. The flue-cured tobacco device according to claim 3, wherein a clamping unit (171) is provided at an end of the bracket (17) opposite to the opening section (13), one end of the clamping unit (171) is abutted the end wall of the thermal insulation canister (16) opposite to the opening section (13) and is sleeved out an external circumferential wall of the thermal insulation canister (16), the other end of the clamping unit (171) is abutted against an inlet pipe (18); a first connecting hole (1711), a second connecting hole (1712) and a first inlet hole (1713) are provided on the clamping unit (171), the first connecting hole (1711) and the second connecting hole (1712) are configured for electric wires connected with two ends of the heating element (15) going through, the first inlet hole (1713) is configured for air inflowing; and wherein a second inlet hole (103) is provided at an end of the shell (1) opposite to the opening section (13), one end of the inlet pipe (18) is communicated with the second inlet hole (103), the other end of the inlet pipe (103) is communicated with the thermal insulation canister (16) through the first inlet hole (1713) of the clamping unit (171).

5. The flue-cured tobacco device according to claim 4, wherein the filter layer structure (14) comprises a first filter layer (141) close to the opening section (13) and a second filter layer (142) opposite to the opening section (13), several first filter holes (1411) are provided on the first filter layer (141), several second filter holes (1421) are provided on the second filter layer (142); and wherein an inner wall of the end of the first receiving section (11) opposite to the opening section (13) shrinks radially to form a first limit step (1111) and a second limit step (1112), the first limit step (1111) and the second limit step (1112) are configured for clamping and fastening the first filter layer (142) and the second filter layer (142) respectively to provide a flowing gap for hot air flowing between the first filter layer (141) and the second filter layer (142); a distance of the flowing gap between the first filter layer (141) and the second filter layer (142) is 0.5 to 8 mm.

6. The flue-cured tobacco device according to claim 5, wherein the flue-cured tobacco device further comprises:

a temperature sensor (3) provided on an outer wall of the first receiving section (11) and configured for measuring a temperature of the cigarette (2) in the first receiving section (11) and transmitting a temperature signal;

a PCB circuit board (4) provided in the third receiving section (101);

an airflow sensor (5) provided in a measuring unit (181), the measuring unit (181) is sleeved outside the inlet pipe (18) and communicated with the inlet pipe (18), the airflow sensor (5) is configured for sensing and transmitting an airflow signal;

a controller (6) provided on the circuit board (4) and connected with the heating element (15), the temperature sensor (3), the airflow sensor (5) respectively, the controller (6) is configured for receiving the airflow signal and the temperature signal and controlling the heating element (15) to heat tobacco material according a preset temperature;

a battery (7) provided in the fourth receiving section (102) and configured for supplying power to the airflow sensor (5), the temperature sensor (3), the controller (6) and the heating element (15); and a switch (8) provided on an outer wall of the shell (1) and connected to the controller (6) and the battery (7)

respectively, the switch (8) is configured for controlling the connection between the controller (6) and the battery (7).

7. The flue-cured tobacco device according to claim 6, wherein a accommodation body (19) is provided axially in the bracket (17), one end of the accommodation body (19) is abutted against an end of the bracket (17) towards the opening section (13) and is communicated with the fixing canister (10) through the bracket (17), the other end of the accommodation body (19) is detachably connected with the thermal insulation canister (16), an end of the accommodation body (19) opposite to the opening section (13) shrinks radially to form a heating canister (193), the first receiving section (11) is formed in the accommodation body (19), the second receiving section (12) is formed in the heating canister (193), the heating element (15) extends helically along an axial of the heating canister (193) and abuts against an inner wall of the heating canister (193);

wherein a fourth connecting hole (194) is opened on an end wall of the accommodation body (19) opposite to the opening section (13), the accommodation body (19) is communicated with the heating canister (193), a second through-hole (195) is opened on an end wall of the heating canister (193) opposite to the opening section (13); and wherein a third thermal insulation space (113) configured for thermal insulation is provided between the thermal insulation canister (16) and the heating canister (193).

8. The flue-cured tobacco device according to claim 7, wherein one end of the heating element (15) runs through the fourth connecting hole (194) and extends opposite to the opening section (13) then runs through the first connecting hole (1711) and is connected to the controller (6) by winding one side of the battery (7), the other end of the heating element (15) runs through the second through-hole (195) and the second connecting hole (1712) then is connected to the controller (6) by wing the other side of the battery (7), two ends of the heating element (15) are space welded to two corresponding sides of the PCB circuit board (4) respectively.

9. The flue-cured tobacco device according to claim 6, wherein a accommodation body (19) is provided axially in the bracket (17), one end of the accommodation body (19) is abutted against an end of the bracket (17) towards the opening section (13) and is communicated with the fixing canister (10) through the bracket (17), the other end of the accommodation body (19) is detachably connected with the thermal insulation canister (16), the first receiving section (11) and the second receiving section (12) are both formed in the accommodation body (19), the heating element (15) is provided circinately between an end wall of the accommodation body (19) opposite to the opening section (13) and the second filter layer (142);

wherein a third connecting hole (191) and a first through-hole (192) are opened on the end wall of the accommodation body (19) opposite to the opening section (13); and wherein a second thermal insulation space (112) configured for thermal insulation is formed between the thermal insulation canister (16) and the end wall of the accommodation body (19) opposite to the opening section (13).

10. The flue-cured tobacco device according to claim 9, wherein one end of the heating element (15) runs through the third connecting hole (191) and extends opposite to the opening section (13) then runs through the first connecting hole (1711) and is connected to the controller (6) by winding one side of the battery (7), the other end of the heating element (15) runs through the first through-hole (192) and the second connecting hole (1712) then is connected to the controller (6) by wing the other side of the battery (7), two ends of the heating element (15) are space welded to two corresponding sides of the PCB circuit board (4) respectively.

11. The flue-cured tobacco device according to claim 5, wherein a diameter of each first filter hole (1411) is 0.2 to 3.0 mm, the several first filter holes (1411) are evenly distributed on the first filter layer (141), a distance of circles centers of each two adjacent first filter holes (1411) is 0.6 to 3.0 mm; and wherein a diameter of each second filter hole (1421) is 0.8 mm to 6.0 mm, a distance from center of each second filter hole to a center of the second filter layer (142) is 2 mm to 12 mm.

12. The flue-cured tobacco device according to claim 4, wherein the fixing canister (10), the thermal insulation canister (16), the bracket (17) and the shell (1) are made of thermal insulation materials, the opening section (13) is made of elastic thermal insulation materials, and the accommodation body (19) is made of thermal conduction materials.

* * * * *